United States Patent [19]

Crall et al.

[11] 4,156,411
[45] May 29, 1979

[54] ENGINE TIMING CONTROL CIRCUIT

[75] Inventors: Frederick W. Crall, Farmington Hills; Earl E. Daniels, Taylor, both of Mich.

[73] Assignee: Chrysler Corporation, Highland Park, Mich.

[21] Appl. No.: 752,490

[22] Filed: Dec. 20, 1976

[51] Int. Cl.² ............................ F02P 5/04; F02P 23/00
[52] U.S. Cl. ............................. 123/117 R; 123/148 E
[58] Field of Search ................. 123/117 R, 148 E; 315/209 R, 209 T; 324/174

[56] References Cited

U.S. PATENT DOCUMENTS

| | | | |
|---|---|---|---|
| 3,596,189 | 7/1971 | Luteran | 123/117 R |
| 3,885,534 | 5/1975 | Webster | 123/117 R |
| 3,923,030 | 12/1975 | Luteran | 123/148 E |
| 3,991,730 | 11/1976 | Crall | 123/117 R |

Primary Examiner—Charles T. Jordan
Attorney, Agent, or Firm—Baldwin & Newtson

[57] ABSTRACT

A pick-up provides a square wave signal whose period corresponds to 720°/N where N is the number of engine cylinders for a four stroke, two cycle internal combustion engine. An integrator is reset by both positive-going and negative-going edges of said square wave signal to produce a sawtooth waveform having a period equal to 360°/N. A blanking circuit which is coupled with the pick-up blanks the sawtooth waveform of said integrator during alternate half cycles of the square wave. The blanked sawtooth waveform is supplied to one input of a comparator and a desired timing signal to the other input of said comparator. The comparator provides an engine timing signal when a predetermined relationship between the blanked sawtooth signal and the desired timing signal is attained. In this way, the engine timing signal is given once per cycle of said blanked sawtooth waveform with the timing thereof relative to said square wave being determined by the desired timing signal. The preferred embodiment discloses a four cylinder engine configuration with electronic spark timing control.

8 Claims, 2 Drawing Figures

ENGINE TIMING CONTROL CIRCUIT

BACKGROUND AND SUMMARY OF THE INVENTION

This invention pertains generally to electronic engine control systems and specifically to a novel electronic circuit for said systems.

The prior art contains electronic engine control circuits which utilize an integrator for providing a reference signal indicative of engine crankshaft position, the integrator being reset at predetermined engine crank angles. For an eight cylinder engine the integrator is typically reset at 90° intervals. The integrator output is compared against a desired timing signal and when a predetermined relationship between the two occurs, an engine timing control signal is given. Because the desired timing signal is a function of one or more parameters useful in controlling the engine, the engine angle, or timing, of the engine timing control signal is thereby controlled in accordance with these input parameters.

The present invention is directed toward a novel engine control and novel circuitry for engine control which utilizes an integrator which is reset at predetermined engine crank angles. Attempts to adapt prior art integrators to a four cylinder engine have encountered a noticeable deterioration in accuracy. One source of this inaccuracy is the longer duration of the integrator period. For example, in going from an eight cylinder to a four cylinder system, the period of an integrator sawtooth waveform increases from 90° to 180°. In a closed-loop type system (for example as shown in U.S. Pat. No. 3,885,534 assigned to the same assignee as the present application) inaccuracies are observed particularly under transient conditions because of associated time constants. Such problems are accentuated in a four cylinder engine because of its more dynamic response.

The present invention provides an improvement whereby these inaccuracies are greatly attenuated or even eliminated entirely thereby promoting accuracy in the timing function. While the present invention is particularly well suited for a four cylinder engine, it will be appreciated that the principles disclosed herein may be applied to other engine configurations.

The invention is disclosed in connection with the accompanying drawings which illustrate a preferred embodiment of the present invention according to the best mode presently contemplated in carrying out the invention.

DESCRIPTION OF THE PREFERRED EMBODIMENT

Figure 1:
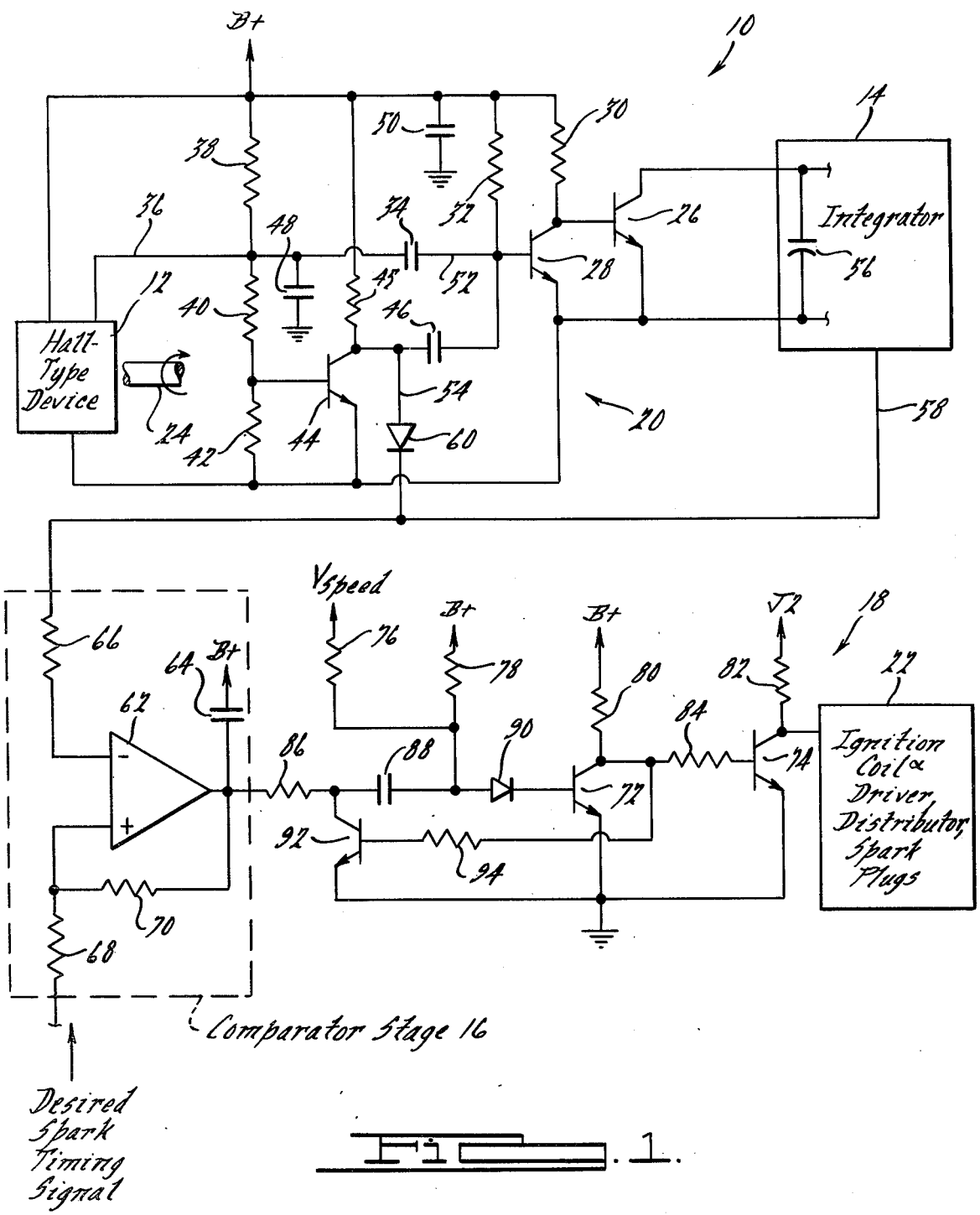
FIG. 1 is an electrical schematic diagram of an engine control system embodying principles of the present invention.

An illustrative electronic engine control circuit 10 embodying principles of the present invention is disclosed by way of example for a four cylinder engine configuration in an electronic spark timing control system. Each of the cylinders fires once per 720° of crankshaft revolution whereby there are four firings per 720°. Circuit 10 shown in FIG. 1 comprises a pick-up device 12, an integrator 14, a comparator stage 16, an ignition stage 18, resetting and blanking circuitry 20 and the usual ignition coil, driver, distributor, and spark plugs shown generally at 22. The pick-up device 12, which is illustrated by way of example as a Hall type device, is energized from the B+ power supply and is operatively coupled with the engine crankshaft 24 to produce an output at line 36 in the form of a square wave signal like that shown by way of illustration at the top of FIG. 2. For the example, the output signal waveform has a period corresponding to 180° of crankshaft rotation (i.e. 720°/4) and each period is composed of two equal half cycles corresponding to 90° of crankshaft rotation. The resetting and blanking circuitry 20 operatively couples pick-up device 12, integrator 14 and comparator stage 16. Integrator 14 comprises an integrating capacitor 56 and other circuitry to generate a linear output voltage ramp. An example of appropriate circuitry for the integrator is disclosed in U.S. Pat. No. 3,885,534 and also in U.S. Pat. No. 4,182,311 both of which are assigned to the same assignee as the present application. The integrating capacitor 56 is reset at predetermined engine crank angles whereby a periodic output ramp signal, which may take the form of a sawtooth waveform, is developed by the integrator. In the integrator circuits of the referenced patents, the peak amplitude of the integrator is closed-loop regulated whereby a sawtooth having a period equal to 720°/N, N being the number of engine cylinders, is generated so that under non-transient engine speed conditions the amplitude of the sawtooth at any instant of time is representative of the instantaneous engine crankshaft angular position. Resetting of the integrator is accomplished by switching a transistor 26 into conduction for a brief instant of time at predetermined engine crankshaft positions to discharge accumulated charge on capacitor 56. This reset circuitry also includes a transistor 28, resistors 30, 32, and a capacitor 34 connected as illustrated. If it is assumed that the output signal waveform at line 36 is high, capacitor 34 is fully charged, and transistor 28 conducts by virtue of the base current supplied through resistor 32. With transistor 28 conducting, transistor 26 is held nonconducting. When the square wave signal at line 36 switches from high to low, the negative-going edge momentarily couples the charge on capacitor 34 as a negative spike to the base of transistor 28 thereby sharply cutting off this transistor. Correspondingly, transistor 26 switches into conduction to discharge capacitor 56. The time constant defined by capacitor 34 and resistor 32 is such that capacitor 34 quickly charges to produce a positive voltage at the base of transistor 28 thereby returning this transistor to conduction and hence cutting off transistor 26. The time constant is such that the resetting occurs within a very small angular range of crankshaft rotation even at maximum crankshaft speed. The next transition of the square wave from low to high serves to fully recharge capacitor 34 so that the next negative-going transition can cause the next reset. In this manner negative-going transitions of the square wave signal at line 36 are coupled through capacitor 34 whereby the integrator is reset by each negative-going transition of the square wave.

Figure 2:
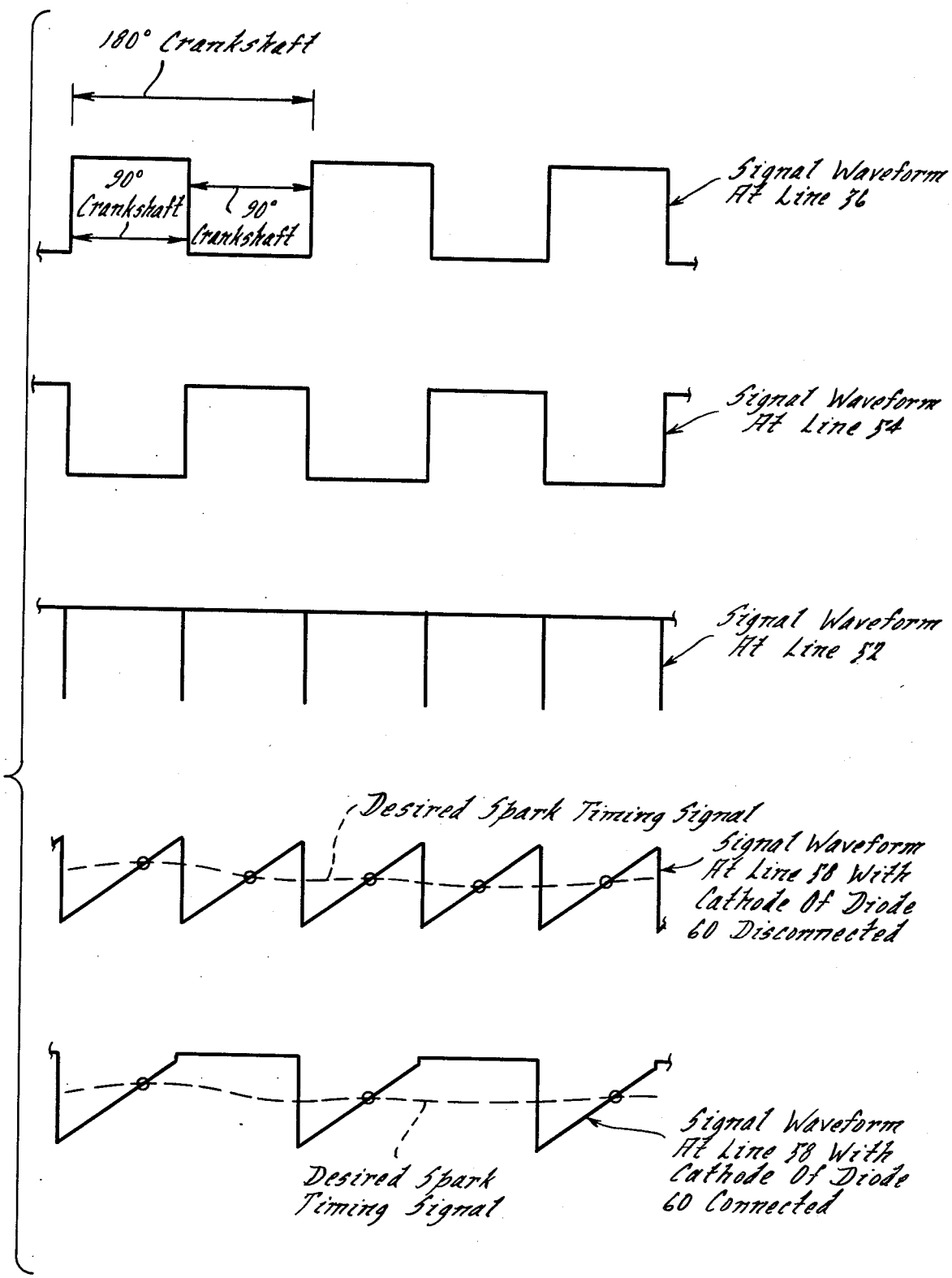
FIG. 2 is a diagram illustrating several waveforms (not necessarily to scale) at selected points of the circuit of FIG. 1 which are useful in explaining the circuit operation.

Circuit 20 comprises additional circuitry which both resets the integrator on each positive-going edge of the square wave and also provides the blanking feature of the present invention. This circuitry includes a series voltage divider comprising series connected resistors 38, 40 and 42 connected across the B+ supply, a transistor 44, a resistor 45 and capacitor 46. Resistor 45 connects the collector of transistor 44 to the positive terminal of the B+ supply, and capacitor 46, the collector of transistor 44 to the base of transistor 28. The junction of resistors 38 and 40 connects to the output of pick-up 12 at line 36. The base of transistor 44 connects to the junction of resistors 40 and 42. This arrangement provides at the collector of transistor 44 (i.e., at line 54) a square wave signal, like the second waveform shown in FIG. 2, which is inverted from the signal waveform at line 36. Capacitor 46 couples the negative-going edge of the line 54 signal waveform to the base of transistor 28 so that transistor 28 is momentarily switched out of conduction in response to each negative-going edge of the line 54 waveform to reset integrator 14. Thus, it will be recognized that the integrator is reset in response to both the positive-going and the negative-going edges of the line 36 waveform signal, in other words, every 90° of crankshaft rotation. The third waveform shown in FIG. 2 illustrates the signal which appears at line 52 (i.e., the base of transistor 28) for resetting the integrator at 90° crankshaft intervals. Radio frequency filter capacitors 48 and 50 are connected as illustrated.

The blanking feature is provided by coupling the collector of transistor 44 through a diode 60 to a line 58 which connects the integrator output to one input of comparator stage 16. So that the blanking feature of the present invention may be better explained, let it be assumed for the moment that the cathode of diode 60 is disconnected from line 58 so that blanking is absent. The fourth waveform of FIG. 2 illustrates the sawtooth integrator output signal which appears under this condition. Absent blanking, the sawtooth has a period of 90° and a spark timing signal would be given once per period of the unblanked sawtooth instead of at the correct 180° intervals.

Now let it be assumed that diode 60 is again connected to line 58 so that blanking is present. The fifth waveform of FIG. 2 illustrates the integrator output signal with blanking. This waveform is a blanked sawtooth waveform wherein alternate cycles of the integrator sawtooth output are blanked. This blanked sawtooth waveform has a period of 180° so that a spark firing signal is given at the correct interval of once per period of the blanked sawtooth. When transistor 44 is nonconducting, diode 60 is forward biased through resistor 45 to the positive terminal of the B+ supply so that the potential at line 58 is forced to slightly above that of the peak of the sawtooth waveform. When transistor 44 is conducting, diode 60 is reversed biased so that the potential at line 58 follows the sawtooth. In this way the signal waveform shown at the bottom of FIG. 2 is developed at line 58. Thus spark firing is prevented during alterate half-cycles of the pick-up square wave. Stated differently, firing is permitted only between consecutive pairs of resettings of the integrator.

Comparator stage 16 comprises a comparator 62, a capacitor 64, and a plurality of three resistors 66, 68 and 70, all of which are connected in circuit as illustrated. A desired spark timing signal derived from one or more parameters useful in controlling spark timing is supplied via resistor 68 to the non-inverting input of comparator 62, and the blanked waveform at line 58 is supplied through resistor 66 to the inverting input of comparator 62. The fifth waveform of FIG. 2 illustrates comparison between the desired spark timing signal and the blanked sawtooth signal whereby an output signal is given at the output of comparator stage 16 each time that the desired spark timing signal intercepts the blanked signal waveform. Accordingly, it can be seen that the firing occurs once per period of the blanked sawtooth waveform at an engine crank angle which is determined by the desired spark timing signal magnitude. In contrast, the fourth waveform (which illustrates diode 60 disconnected from the circuit) demonstrates that absent blanking the firing would occur twice per period of the square wave pick-up signal.

An important advantage of the present invention is that the slope of the ramp signal is increased from what it would be in a system where the sawtooth has a period of 180°. This means that a sharper intercept is provided thereby yielding improved accuracy in the timing than would otherwise be available. A further advantage obtains where a closed-loop type integrator is used because the time constants associated with the integrator do not have to be compromised.

The remainder of the circuit comprises an ignition firing stage including a pair of transistors 72, 74, a number of resistors 76, 78, 80, 82, 84, and 86, a capacitor 88, and a diode 90. A lock-out circuit including a transistor 92 and a resistor 94 is provided and all these components are connected as illustrated in the drawing. The output signal given by comparator stage 16 is in the form of a negative-going pulse coupled through resistor 86 and capacitor 88 to reverse bias diode 90 and cut-off transistor 72. The rise in collector voltage at transistor 72 is supplied through resistor 84 to switch transistor 74 into conduction and thereby fire the ignition coil driver stage (not shown) which in turn fires the ignition coil to deliver the spark via the distributor to the appropriate spark plug. The rise in collector voltage at transistor 72 renders transistor 92 conductive during an anti-dwell timing cycle. The duration of conduction of transistor 72 is established via the anti-dwell timing characteristics of resistors 76, 78, and capacitor 88 as well as the $V_{speed}$ signal which is an analog speed signal which may be derived from integrator 14. This endows the circuit with a speed related anti-dwell characteristic and is desirable in securing best performance. When transistor 72 switches into conduction, transistor 92 is cut off and the circuit transiently returns to its initial condition to await the next firing pulse from comparator stage 16.

While one specific preferred embodiment of the invention has been disclosed, its principles are applicable to other configurations. Other types of pick-ups and integrators may be used. Other than four cylinder engines can utilize the invention. The invention can be employed in other engine timing control functions than spark timing, for example, fuel injector timing. Thus, there has been presented a novel and versatile engine control and circuit.

What is claimed is:

1. In an electronic engine control system wherein an engine control signal is generated in controlled relation to the rotational position of the engine crankshaft, the combination comprising:
   first means providing an alternating reference waveform having a period corresponding to a given crankshaft rotational range and within each period two half-cycles of essentially equal duration;
   second means comprising an integrator for generating an output ramp function;
   third means coupling said first means and said second means for resetting said integrator every half-cycle of said reference waveform;

fourth means providing a signal whose value represents a crankshaft rotational position which is a function of at least one parameter useful in controlling the engine;

fifth means coupled with said second means and said fourth means for comparing said last-mentioned signal and said output ramp function and producing said engine control signal when a predetermined relationship between the two occurs; and sixth means coupled with said first means and said fifth means for preventing said engine control signal from being given during alternate half-cycles of said reference waveform.

2. The combination of claim 1 wherein said sixth means comprises means for blanking said output ramp function during said alternate half-cycles of said reference waveform.

3. The combination of claim 1 wherein said first means comprises means providing said alternating waveform as a square wave signal.

4. In an electronic engine control system wherein an engine control signal is given in controlled relation to the rotational position of the engine crankshaft, the combination comprising:

first means comprising an integrator providing a ramp output signal;

second means operatively coupling said crankshaft and said first means for resetting said integrator at predetermined engine crankshaft rotational positions;

third means providing a signal whose value represents a crankshaft rotational position which is a function of at least one parameter useful in controlling the engine;

fourth means coupled with said first means and said third means for comparing said last-mentioned signal and said ramp output signal and producing said engine control signal when a predetermined relationship between the two occurs; and fifth means coupled with said second means and said fourth means for permitting said engine control signal to be given only between consecutive pairs of resettings of said integrator.

5. The combination of claims 4 wherein said second means comprises means for resetting said integrator at uniform intervals of engine crankshaft rotation.

6. The combination of claim 4 wherein said fifth means comprises means for blanking said ramp output signal during intervals between the two resettings of each pair.

7. In an electronic engine control system wherein an engine control signal is generated in controlled relation to the rotational position of the engine crankshaft, the combination comprising:

first means providing an alternating reference waveform having a period corresponding to a given crankshaft rotational range and within each period two half-cycles of essentially equal duration;

second means which is reset by said first means every half-cycle of said reference waveform and which generates an output signal having a period equal to one half-cycle of said reference waveform, said second means comprising means for generating said output signal such that the value thereof over each period thereof progressively changes from an initial value attained upon resetting of said second means by said first means to a final value attained immediately prior to the next resetting of said second means by said first means whereby the value of said output signal is made representative of instantaneous crankshaft rotational position during each period thereof;

third means providing a desired timing signal whose value represents a crankshaft rotational position which is a function of at least one parameter useful in controlling the engine;

fourth means coupled with said second means and said third means for comparing said desired timing signal and said output signal and producing said engine control signal when a predetermined relationship between the two occurs; and fifth means coupled with said first means and said second means for blanking alternate cycles of said output signal such that occurrence of said predetermined relationship between said desired timing signal and said output signal is prevented during such alternate cycles of said output signal to thereby prevent said engine control signal from being given during such alternate cycles of said output signal.

8. In an electronic engine control system wherein an engine control signal is given in controlled relation to the rotational position of the engine crankshaft, the combination comprising:

first means providing reset signals at predetermined engine crankshaft rotational positions;

second means which is reset by each reset signal and which generates an output signal such that the value thereof progressively changes from an initial value attained upon each resetting of said second means by said first means to a final value attained immediately prior to the next resetting of said second means by said first means whereby the value of said output signal is made representative of instantaneous crankshaft rotational position;

third means providing a desired timing signal whose value represents a crankshaft rotational position which is a function of at least one parameter useful in controlling the engine;

fourth means coupled with said second means and said third means for comparing said desired timing signal and said output signal and producing said engine control signal when a predetermined relationship between the two occurs; and fifth means coupled with said first means and said second means for blanking said output signal only between consecutive pairs of reset signals such that occurrence of said predetermined relationship between said desired timing signal and said output signal is prevented between such consecutive pairs of reset signals to thereby prevent said engine control signal from being given between such consecutive pairs of reset signals.

* * * * *